United States Patent Office 2,970,232
Patented Jan. 31, 1961

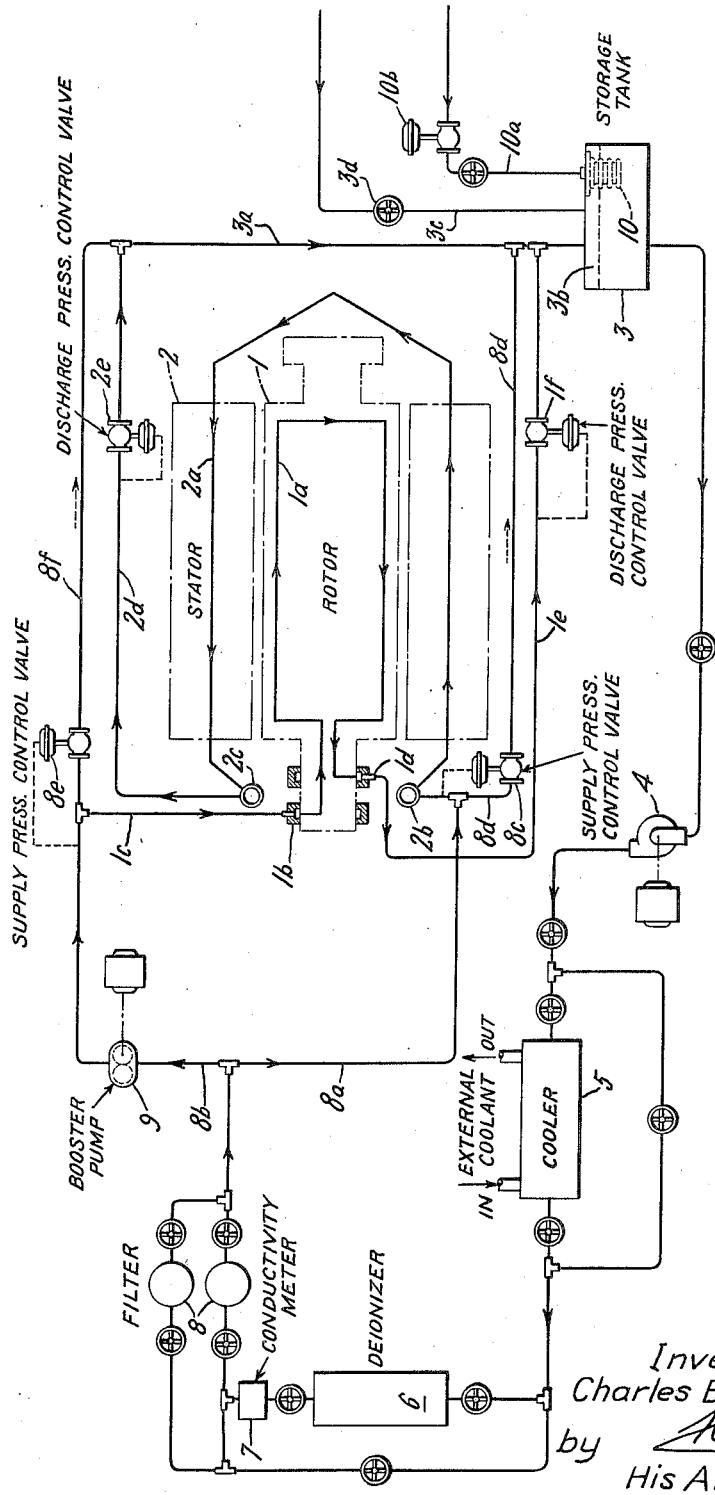

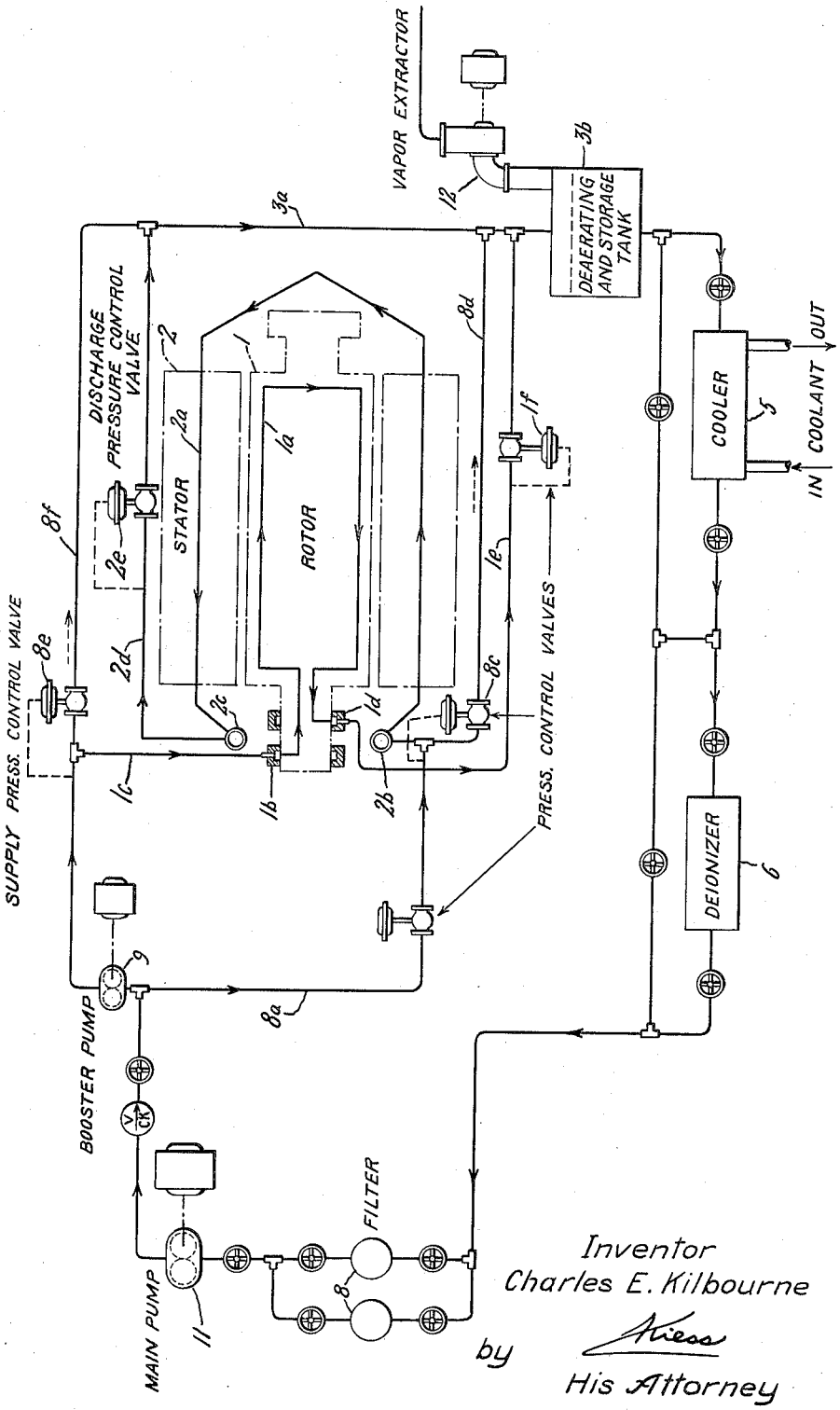

2,970,232

CONDUCTOR-COOLED GENERATOR

Charles E. Kilbourne, Schenectady, N.Y., assignor to General Electric Company, a corporation of New York Filed Oct. 21, 1958, Ser. No. 768,764

9 Claims. (Cl. 310—54)

This invention relates to cooling systems for dynamoelectric machinery and like equipment, particularly to an improved cooling system for a large capacity generator of the "conductor-cooled" type, which has cooling passages formed within the main ground insulation which electrically insulates the copper (or other conductive material) conductors of the rotor and the stator from the rotor body and from the laminated stator core and related structures. It pertains specifically to an improved water (or other appropriate liquid) cooling system for such dynamoelectric machines.

In recent years, generators used in central stations have rapidly become larger and larger in their kilowatt and kilovolt-ampere outputs. Since the temperatures of the electrical conductors, and the insulating materials associated with them in the generators, are important limiting factors in the output obtainable from a generator of given physical dimensions and weight, increasing attention has been paid to the problem of lowering and controlling these temperatures by providing effective cooling systems. This is obviously economically very desirable. Also, since obtaining increased outputs by increasing dimensions and weights creates problems both in providing the necessary space and foundations in powerplants, and from the viewpoint of transporting the generator parts from the place of manufacture to the place of use, it is desirable to hold weights and dimensions down.

Many types of cooling systems for dynamoelectric machines are disclosed in the prior art. The most frequently used coolant for very large capacity generators in recent years has been hydrogen, and various means have been used for increasing the capacity of such machines through more effective use of the hydrogen coolant. One such method has been to increase the density of the hydrogen by raising its pressure in order to improve its thermal characteristics, particularly its ability to absorb heat per unit of volume of hydrogen flow. More recently liquid cooling systems have been proposed. Various liquid coolants have been considered, including suitable petroleum oils, the askarel dielectric fluid sold as "Pyranol" by the General Electric Company, water, and others. Machines with transil-oil-cooled stator windings circulating the oil in liquid form are now in operation. Furthermore, it has been suggested that cooling systems could be so arranged that the coolant evaporates in the cooling passages, thus adding the heat of vaporization to the thermal capacity of the cooling liquid.

Water, the most readily available coolant and the liquid which is at the same time most effective from the standpoint of thermal capacity, is now being placed in use. The use of de-ionized water, at pressures on the order of 35 to 40 p.s.i.a. as a stator winding coolant, is described in the co-pending application of E. J. Flynn, Serial No. 642,409, filed February 26, 1957, and assigned to the same assignee as the present application.

The present invention comprehends the use of suitable liquid coolants, for instance water, not only in the stator windings, but also in the rotor windings. Significant advantages can be obtained by raising the boiling point of liquids whose boiling point may be normally at a low pressure, by substantially increasing the liquid pressure. For example, the temperature limits established by the characteristics of the insulation and other materials used in generator windings are today substantially higher than 212° F., the boiling point of water at atmospheric pressure. Consequently, if water were used, full utilization of the materials in the machine might be limited by the characteristics of the coolant rather than by other limitations such as the characteristics of the materials. However, as is well known, the boiling point of water can be increased by raising the pressure, for example, to 293° F. at 60 p.s.i.a., to 327° F. at 100 p.s.i.a., and to about 360° F. at 150 p.s.i.a. Higher boiler points may be obtained with further increased pressures.

Liquid cooling systems for large generators built heretofore have used liquid coolant only in the stator winding. In addition to the problems encountered in the stator, significantly more difficult problems are encountered when it is attempted to use water to cool the rotor windings. Many of these problems stem from the fact that centrifugal forces act very strongly on liquid in the rotor cooling passages, while there are no such centrifugal forces added to the comparatively smaller forces of gravity in the stator windings. These centrifugal forces tend to create substantial pressure differentials in the cooling passages of the rotor windings, which may result in reduced pressures at certain locations. This can tend to cause the liquid to evaporate and produce "pockets" of vapor at such locations. Pressurizing the entire rotor cooling circuit greatly minimizes this tendency. Should the density of the liquid vary in different portions of the rotor passages, particularly if it vaporizes in certain locations, it may result in the rotor becoming dangerously out of mechanical balance. Furthermore, the rate of heat transfer at such locations will be adversely affected, producing local "hot-spots," which are undesirable and which may lead to thermal unbalance of the rotor.

Accordingly, an object of the present invention is to provide an improved liquid cooling system for a high capacity dynamoelectric machine especially arranged to insure that the coolant does not become the limiting factor in determining the allowable temperature of the machine parts, thus restricting its output.

A further object is to provide a dynamoelectric machine cooling system specifically adapted to insure the coolant remaining liquid in all parts of the circuit so as to avoid vapor pockets.

A still further object is to provide a dynamoelectric machine cooling system capable of effectively being applied to direct cooling of the conductors of both the stator and the rotor.

Other objects and advantages will become apparent from the following description taken in connection with the accompanying drawings in which:

Fig. 1 is a schematic diagram of one form of pressurized liquid cooling system particularly suitable for the use of water, in accordance with the invention; and Fig. 2 is a schematic representation of another form of pressurized liquid cooling system.

Generally stated, the invention is practiced by providing liquid cooling passages in either or both the rotor and stator of a large dynamoelectric machine and maintaining the coolant fluid at a sufficiently high minimum pressure in all portions of the rotor and/or stator passages so that there is no probability of a significant quantity of the liquid evaporating. Thus the entire cooling system is occupied by fluid of known thermal capacity and density, facilitating both the mechanical and thermodynamic design of the system.

Referring now more particularly to Fig. 1, the invention is shown as applied to a dynamoelectric machine such as a very large capacity generator having a rotor illustrated diagrammatically at 1 and a stator 2. The stator is provided with a cooling system, which may for instance be in accordance with one of those illustrated in the U.S. patent to Kilbourne, 2,695,368, issued November 23, 1954, and assigned to the assignee of the present application, in certain of which liquid is circulated through cooling passages defined by tubular conductors, or by separate cooling tubes disposed in good heat transfer relation with solid conductors. The mechanical details of such direct-cooled conductors are not a part of the present invention and therefore are not disclosed in more detail here. The rotor 1 likewise may have conductors of various direct-cooled arrangements, or the cooling passages may be formed in the body of the rotor, for instance as illustrated in United States patents to Hobart, 1,121,014, issued December 15, 1914, and Savage, 1,135,327, issued April 13, 1915, both assigned to the assignee of the present invention. The U.S. patent to Porter, 1,145,612, issued July 6, 1915, and the patent to Seidner, 1,448,700, issued March 13, 1923, describe dynamoelectric machines having direct-cooled conductors in both rotor and stator.

In order to simplify the disclosure of the present invention, only one cooling circuit in the rotor and stator are illustrated; however, it is to be understood that as many such circuits as are desirable may be used. The rotor coolant flow path is identified 1a and the stator coolant circuit 2a. The stator coolant passages are connected by suitable branch conduits to an annular supply header identified 2b and a similar discharge header identified 2c. Cooling water is supplied to the rotor through a suitable annular fitting 1b, which, in turn, is supplied by a first inlet conduit 1c, and removed through a similar annular discharge fitting 1d.

As indicated by the flow arrows in the drawing, cooling water is supplied from a storage tank 3 to a circulating pump 4, thence to a heat exchanger 5 where the heat picked up in the generator is transferred to a suitable external coolant, and discharged from the system. From cooler 5, the water passes through the de-ionizer 6 which continuously removes any mineral or metal ions which may be picked up by the coolant, as disclosed more completely in the aforesaid Flynn application, Serial No. 642,409. The de-ionized coolant passes through a conductivity meter 7 which serves to check the operation of the de-ionizer and then passes through suitable filters 8. As shown in the drawing, there may be two filters in parallel with suitable valves for permitting either to be removed from service while the other continues to operate. Likewise, the de-ionizer 6 and cooler 5 may be provided with valved bypasses in the manner shown in the drawing. The bypass around cooler 5 may be employed to alter the cooling effect of this heat exchanger, in a manner which will be obvious.

Coolant is supplied to the stator header 2b by a branch conduit 8a, and by conduit 8b to the rotor inlet fitting 1b. Conduit 8b contains a booster pump 9 serving a purpose which will be described more particularly hereinafter. Spent coolant is discharged from the rotor through fitting 1d and conduit 1e, while the stator coolant is removed by the header 2c and discharge conduit 2d.

In accordance with the invention, the pressure maintained in the cooling circuit is very substantially higher than has been suggested in the past. Specifically, it is contemplated that the coolant pressure throughout the stator and rotor will have a minimum value on the order of at least 30 to 40 pounds per square inch absolute and perhaps up to 150 p.s.i.a. or higher. The importance of maintaining a minimum pressure of this order of magnitude will be seen from the following.

If, as has been suggested previously, the water were at a comparatively low pressure, the maximum temperature of the coolant would be the boiling temperature of the water, not much higher than perhaps 100° C. But such a comparatively low operating temperature is uneconomical, since the high state of development of the insulating materials used in such machinery permits safe operating temperatures on the order of 120° C. to 130° C., or even higher. Thus a prime purpose in maintaining a high pressure level in the cooling system is to bring the coolant boiling temperature to a value which will permit the use of the maximum temperature at which the insulating materials (or other temperature-limiting materials) may safely operate. By maintaining pressures of the magnitude indicated, suitably high temperatures are obtained without danger of vapor pockets forming, with resultant changes in the thermal properties of the coolant and possible mechanical unbalance due to changes of density of the coolant in the rotor passages.

The means disclosed in Fig. 1 for achieving the desired coolant pressures comprise the following.

The minimum pressure in the entire coolant system may be determined in several ways. Perhaps the simplest is to provide a space above the liquid in reservoir 3, this space being identified 3b in Fig. 1. This space is maintained at a suitable pressure, as for instance by admitting gas from a suitable source at a pressure determined by the regulating valve 3d. This gas may be inert gas such as nitrogen, or it may be hydrogen. This gas space provides a compressible "cushion" which serves to resiliently absorb any pressure fluctuations which may occur in the liquid-filled portion of the circuit. It will be apparent that by suitably regulating the valve 3d, the pressure in the reservoir 3 may be adjusted at will. If there are reasons why the gas used to pressurize the reservoir should not be permitted to mix with the liquid coolant, an alternate pressurizing arrangement may be used. This comprises a positive displacement member represented as a flexible bellows 10 mounted in the storage tank 3. This is supplied with air or other gas, water, hydraulic oil, or other suitable fluid pressure by conduit 10a containing a suitable pressure regulating valve 10b.

It will be apparent that changing the fluid pressure in bellows 10 will have the effect of changing its volume and thereby increasing or decreasing the pressure of the liquid coolant in the closed storage tank 3 and the interconnected liquid-cooling circuits.

The cooling water is caused to circulate by the pump 4, which may be of a relatively low power type, since it needs to furnish only the pressure rise required to overcome the fluid friction losses in the coolant passages. That is, the pressurizing system 3c, 3d or 10, 10a, 10b maintains the minimum pressure desired in the system, and pump 4 contributes just the pressure rise required to overcome fluid friction due to circulation through the system.

The function of the booster pump 9 is to provide an elevated supply pressure for the coolant going to the rotor. This is necessary because the very strong centrifugal field experienced by the coolant in the rotor passages may create high pressure differentials which may produce an increased tendency to cause the fluid to vaporize in certain portions of the circuits. By increasing the supply pressure to the rotor by means of booster pump 9, the minimum pressure in the rotor passages is increased, and thus the tendency for the liquid to evaporate is reduced. The supply pressure to the rotor may for instance be on the order of several times the stator pressure.

The drawing shows various pressure regulating valves and bypass conduits for insuring the maintenance of the desired pressures in the rotor and stator cooling circuits. These include valve 8c in the bypass conduit 8d which communicates between the stator supply conduit 8a and the drain conduit 3a. Valve 8c may for instance be set to maintain the supply pressure in header 2b at a value on the order of 60 to 100 p.s.i.a. Similarly, the rotor supply pressure is determined by pressure regulating valve 8e disposed in a bypass conduit 8f which communicates from the supply conduit 1c to the drain conduit 3a. Valve 8e may for instance be adjusted to maintain a rotor supply pressure on the order of 150 to 300 p.s.i.a.

In addition to the supply pressure control valves 8e, 8c, it is desirable to provide additional pressure control valves, including pressure regulating valve 1f disposed in the drain conduit 1e from the rotor discharge fitting 1d, and an analogous pressure regulating valve 2e in the discharge conduit 2d from the stator. These valves serve to maintain constant at desired values the discharge pressures on the rotor and stator respectively, and thus serve to establish a preselected minimum pressure in the respective rotor and stator cooling circuits.

With this arrangement, the valves 1f, 2e insure that the pressures in all portions of the rotor and stator circuits will be above a preselected minimum value, and the supply pressure control valves 8c, 8e insure that the inlet pressure to the respective cooling circuits will be high enough to produce the rate of flow required for effective cooling. With the accurate control of the pressure thus provided in various portions of the cooling circuit, it can be assured that the rate of flow of coolant will be adequate to maintain the temperatures desired, and that the pressures will remain high enough to prevent the formation of vapor in any portion of the coolant passages.

As noted above, the cooling system of Fig. 1 has the advantage that the circulating pump 4 consumes only the power required to make up the friction losses in the cooling circuit, while the special pressurizing system maintains the minimum pressure desired in the circuit. This system has the disadvantage that the storage tank 3 and all portions of the coolant supply and drain conduits must be maintained above the preselected minimum pressure. Accordingly, it may in some cases be found preferable to employ the system of Fig. 2, which is generally similar to that of Fig. 1 but with the following differences. Here, the coolant storage tank 3b, the cooler 5, deionizer 6, and filter 8 are subjected only to the pressure required to circulate the coolant through these components, while the main pump illustrated diagrammtically at 11 furnishes the entire pressure rise required to elevate the coolant to the supply pressure desired for the stator passages. Here again, the booster pump 9 creates the elevated pressure required in the rotor passages. Otherwise, the system of Fig. 2 may be generally similar to that of Fig. 1.

It will be seen that the system of Fig. 2 has the advantage that only the generator cooling passages are subjected to the elevated pressures desired, while a very large portion of the circuit is at much lower pressures, only slightly, if at all, above atmospheric pressure.

A vapor extractor pump 12 may be provided to remove noncondensible gases from the top of the tank 3b. Then the storage tank 3b also serves as a de-aerating or settling tank in which non-condensible gases separate from the liquid and are expelled by the pump 12. The removal of such non-condensible gases of course helps to avoid "vapor pockets" forming in the rotor passages.

While the example described specifically herein has employed water as the coolant liquid, it will of course be appreciated that many othersuitable liquids may be used, for instance, appropriate ethylene glycols, such as that sold by Union Carbide Corporation as "Ucon" oil, or appropriate liquid fluor-carbons, or liquid silicones.

It will be apparent from the above description that the minimum pressures to be maintained in the respective rotor and stator circuits will depend on many factors in the design of the machine. In the stator passages, the pressure need be only high enough to prevent the formation of significant quantities of vapor at the desired operating temperature level; whereas, in the rotor, the design of the passages, the speed of rotation, and the resulting strength of the centrifugal force field must be considered carefully to determine the minimum pressure required to prevent the formation of vapor at any point. This pressure may easily be three or four times higher than the pressure in the stator circuits. With the pressure-maintaining and regulating equipment described above, appropriate pressures can be effectively maintained in the respective circuits.

It is also to be observed that it is not necessary that both rotor and stator be provided with liquid-cooling circuits. That is, the stator might be liquid-cooled as disclosed herein and the rotor provided with more conventional hydrogen-cooling means. Conversely, the rotor might be liquid-cooled and the stator provided with a conventional hydrogen-ventilating system.

It may also be noted that the booster pump 9 may not be needed if the passages in the rotor are appropriately designed so that centrifugal force provides the increased pressure required to prevent formation of vapor.

It will be appreciated that the invention is amenable to numerous other modifications, and it is of course desired to cover by the appended claims all such modifications as fall within the true spirit and scope of the invention.

What I claim as new and desire to secure by Letters Patent of the United States is:

1. In a conductor-cooled electro-magnetic device having at least one winding including cooling passages for removing heat directly from the electrical conductor, the combination of a source of coolant liquid under pressure, means for supplying liquid coolant from said source to the winding at an inlet pressure adequate to maintain the coolant in the liquid state throughout all parts of the winding, and means for maintaining the coolant pressure at the outlet from the winding at a preselected minimum value such that the boiling point of the coolant at said outlet pressure is above the outlet temperature of the coolant, whereby the coolant experiences no substantial tendency to vaporize in any portion of the winding.

2. In a conductor-cooled electro-magnetic device having a liquid cooling circuit for removing heat directly from a winding thereof, the combination of a source of coolant liquid, means for supplying liquid coolant from said source to the winding at an inlet pressure adequate to maintain cooling flow through the winding with local pressures corresponding to boiling points which remain substantially above the local temperature of the liquid at all points throughout the winding, and pressure regulating valve means maintaining the coolant pressure at the outlet from the winding at a preselected minimum value corresponding to a boiling point substantially above the outlet temperature of the liquid, whereby no significant quantities of coolant vapor form in any portion of the winding.

3. In a conductor-cooled electro-dynamic machine having a first closed liquid cooling circuit for removing heat from the stator windings and a second closed liquid cooling circuit for removing heat from the rotor windings, the combination of first conduit means for supplying coolant liquid to said stator and rotor cooling circuits and including heat exchanger means for removing heat from the coolant, second conduit means for returning spent coolant from the stator and rotor coolant circuits to the heat exchanger, pump means for circulating coolant through the heat exchanger and to the rotor and stator cooling passages, and means maintaining a preselected minimum pressure substantially above the boiling point of the coolant in all portions of said closed cooling circuits and conduits.

4. Pressurized liquid cooling system for electro-dynamic machines in accordance with claim 3, in which the pressurizing means comprises a coolant storage reservoir closed to the atmosphere, and means for supplying a pressurizing gas to a space above the liquid in said reservoir for establishing the minimum pressure desired in the system.

5. Pressurized liquid cooling system for electrodynamic machines in accordance with claim 3 in which the pressurizing means comprises a variable displacement member disposed in the closed coolant circuit, and means for changing the displacement volume thereof and thereby altering the minimum pressure in the closed coolant circuit.

6. Pressurized liquid cooling system for electrodynamic machines in accordance with claim 3 and including booster pump means for elevating the pressure of coolant supplied to the rotor substantially above the pressure of the coolant supplied to the stator, to insure the absence of vapor pockets in the rotor coolant passages irrespective of pressure gradients established by centrifugal force acting on the liquid in the rotor passages.

7. In combination with a conductor-cooled electromagnetic machine having a first closed liquid-cooling circuit for removing heat from a winding thereof, a reservoir for liquid coolant, first conduit means supplying coolant liquid from the reservoir to said winding, heat exchanger means for removing heat from the coolant, second conduit means returning spent coolant from the winding to the reservoir, pump means for circulating coolant from the reservoir through the heat exchanger and the winding and back to the reservoir at inlet pressures to the winding adequate to maintain the coolant in the liquid state in all portions of the winding, and pressure regulating means in said second conduit for maintaining the pressure of the coolant at the outlet from the winding substantially above the pressure corresponding to the boiling point of the liquid at the winding discharge temperature.

8. A conductor-cooled electro-magnetic machine in accordance with claim 7 and including means for supplying a gas under pressure to the space above the liquid in the coolant reservoir for establishing a preselected minimum pressure effective to maintain the coolant in the liquid state throughout the coolant flow path.

9. A conductor-cooled electro-magnetic machine in accordance with claim 8 and including vapor extractor pump means for withdrawing non-condensible gases from the space above the liquid in the coolant reservoir, the main circulating pump serving to raise the coolant pressure to the value required at the winding inlet for maintaining the local pressures of the coolant substantially above the vaporization pressure of the coolant at all points in the winding.

References Cited in the file of this patent

UNITED STATES PATENTS

| 1,448,700 | Seidner | Mar. 13, 1923 |
| 1,696,612 | Rice | Dec. 25, 1928 |

FOREIGN PATENTS

| 311,940 | Switzerland | Feb. 15, 1956 |

OTHER REFERENCES

Liquid Cooling Of Turbine Generators, by Carl J. Fechheimer, A.I.E.E. Technical paper 47–95 of December 1946, pp. 3, 12, 13, 19, 20.

Power Engineering, vol. 57, No. 8, August 1953, pp. 98 and 100.